Oct. 10, 1961     A. ALFORD     3,004,153
CIRCUIT FOR USE WITH A PLURALITY OF ANTENNAS
Filed Jan. 4, 1957
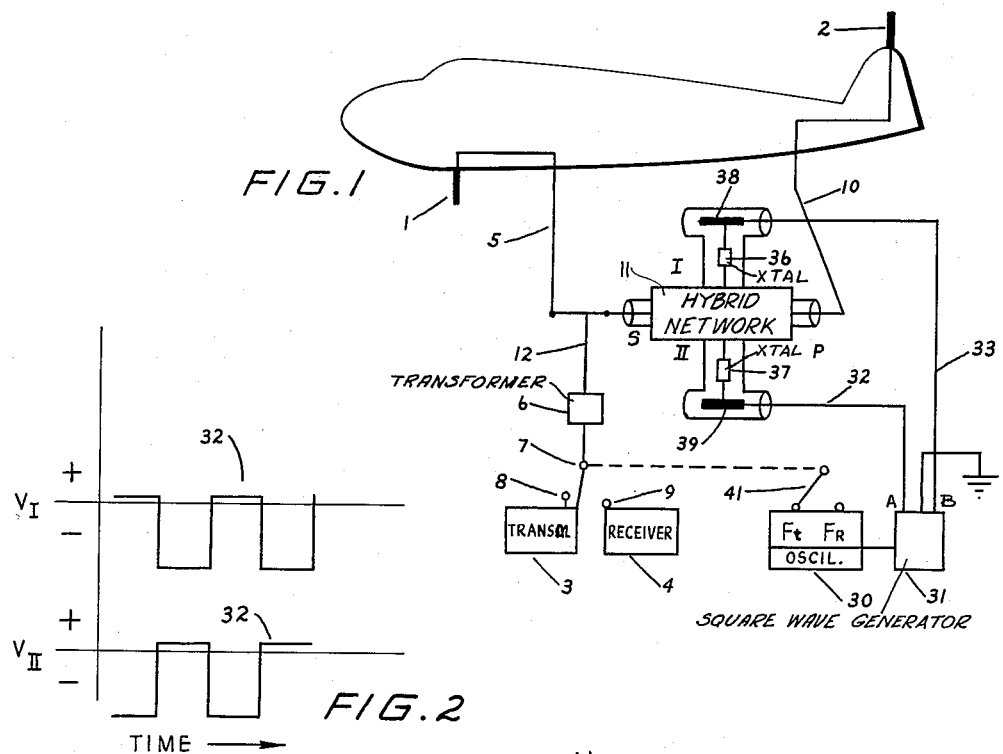
FIG.1
FIG.2
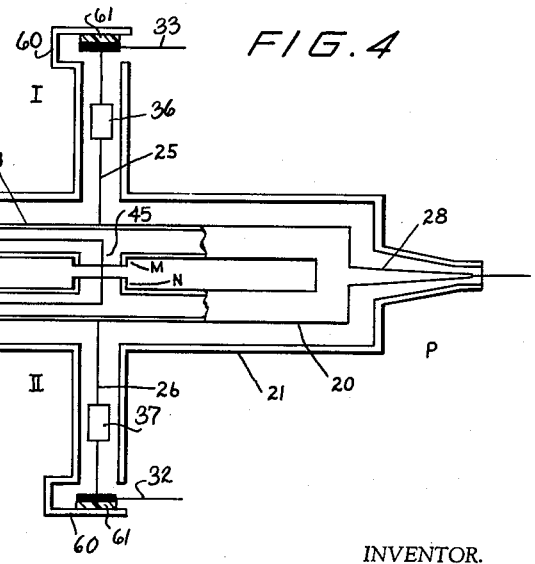
FIG.4
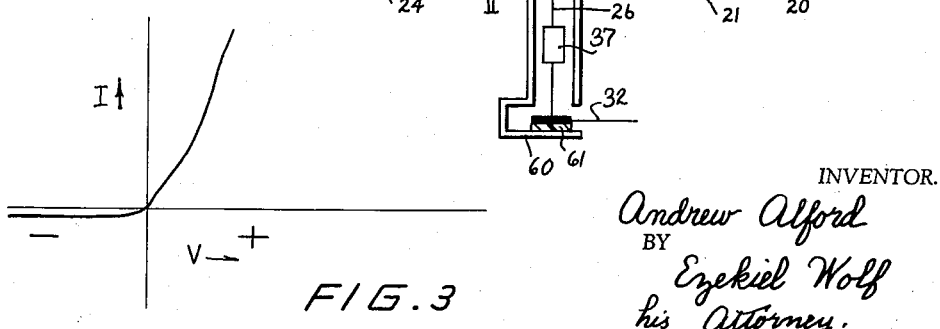
FIG.3
INVENTOR.
Andrew Alford
BY
Ezekiel Wolf
his Attorney.

United States Patent Office 3,004,153
Patented Oct. 10, 1961

3,004,153
CIRCUIT FOR USE WITH A PLURALITY OF ANTENNAS
Andrew Alford, Winchester, Mass.
(299 Atlantic Ave., Boston, Mass.)
Filed Jan. 4, 1957, Ser. No. 632,484
16 Claims. (Cl. 250—13)

The present invention relates to a means and method of selectively connecting a plurality of antennas to a transmitter or receiver for the purpose of minimizing the effect of nulls produced by simultaneous transmission or reception of out of phase signals from the plurality of antennas. In particular, the present invention relates to and is intended to provide a means for selectively connecting a plurality of antennas to a transmitter or receiver mounted in aircraft, for aircraft to aircraft, or aircraft to ground transmission. This invention incorporates principles embodied in the invention disclosed and claimed in the copending application of Lindsay Russell, entitled Phase Wobbler, Serial No. 690,969, filed October 18, 1957, and assigned to the assignee of this application.

A major problem in aircraft communication is created by the mass of the aircraft itself, which, particularly at the higher frequencies now being used, as for example 200 megacycles and up where the wavelength is small compared to the length and width of the aircraft, causes nulls in the radiation pattern of the aircraft antenna. Such nulls are particularly deep when the wings of the fuselage of the aircraft lies between the point to or from which the signal is being transmitted and the antenna mounted on the aircraft. The present invention is designed to overcome this problem by mounting on an aircraft two antennas at mutually complementary positions on the aircraft, as for example at the upper side of the tail and the lower side of the nose. These antennas are connected to a transmitter and receiver selectively through a switch and a transformer with one antenna being connected directly to the tranformer and the other antenna being connected to the transformer through a hybrid. An oscillator and a shaped wave generator are used to vary the radio frequency impedances of crystal rectifiers connected to terminals of the hybrid in such a manner as to present alternating high and low impedances at the opposite side terminals of the hybrid, thus, causing the hybrid to vary the phase of the transmitted wave through it by 180° in a manner more fully described hereinafter. This variation of the phase of the signal received from or transmitted to the antenna is produced at a super-sonic rate, thus, effectively overcoming the nulls which might otherwise be produced by out-of-phase reception of signals received from the two antennas.

These and other features of the present invention will be more clearly understood when considered in conjunction with the accompanying drawing, in which:

FIGURE 1 is a schematic representation of the invention.

FIGURE 2 and FIGURE 3 are graphs used in connection with the explanation of the present invention, and, FIGURE 4 is a schematic diagram of a hybrid adapted for use in the present invention.

A pair of antennas 1 and 2 of suitable design are mounted on complementary portions of the aircraft or other objects with which this device is used. The antennas should be selected in accordance with accepted antenna theory for the particular installation in question. The antennas are used to transmit or receive signals from the transmitter or receiver 3 and 4. Antenna 1 is connected through the line 5, transformer 6 which is preferably a 2 to 1 transformer and switch 7, to either the transmitter 3 or receiver 4, depending upon which contact 8 or 9 is closed. The other antenna 2 is connected through the line 10 to the hybrid 11 with the line 10 being connected to terminal "P" of the hybrid. Terminal "S" of the hybrid is connected through line 12 to the transformer 6 and switch 7 to either the transmitter 3 or receiver 4 depending upon which contact 8 or 9 is closed.

The hybrid 11 is similar in design to that illustrated in the co-pending application, Serial No. 550,242, to Chester B. Watts, Jr., filed November 23, 1955. In FIGURE 4 the terminals "S" and "P" and I and II correspond with those illustrated in FIGURE 1. In the particular hybrid illustrated, there is provided, in general, a U-shaped coaxial transmission line 20 mounted in a carefully made rectangular cross sectioned cavity 21. The outer conductor of the cable 20 is interrupted by a small gap MN. The inner conductor 22 extends through the outer conductor leg 23 to the point 45 and then extends across the gap MN in a U-shaped fashion, back part way down the leg 24 of the U-shaped tubular conductor 20. Conductors 25 and 26 are connected through openings in the rectangular cavity 21 to opposite points on the U-shaped conductor. These connections are made at or near the center point of the long dimensions of the U-shaped conductor as illustrated. The coaxial terminal "P" comprises a metal connecting piece 28 which is connected to the conductor 20 at the right of the U as illustrated. The outer conductor of the coaxial terminal "P" is connected to the metal enclosure 21.

As indicated in the prior application cited above, the function of the hybrid is such that the phase of the transmitted wave at terminal "P" may be varied by 180° by alternately open circuiting and short circuiting side terminals I and II alternately. By so varying the phase of the transmitted wave from antenna 2 with respect to transmitted wave from antenna 1, nulls in reception or transmission caused by simultaneous out-of-phase signal reception from the two antennas can be effectively overcome. When used in voice communication, the variation in phase is preferably at a rate substantially in excess of normal telephone communication frequencies, as for all example, 10,000 c.p.s. in the case of audio frequencies from 200 to 3500 c.p.s. or thereabouts.

In order to obtain a phase variation at the desired rate, as for example, 10,000 c.p.s. in the reception of signals or 20,000 c.p.s. in the transmission of signals, there is provided an oscillator 30 adapted to selectively oscillate at frequencies of 10,000 or 20,000 c.p.s. for example. This oscillator is connected to a shaped wave generator as for example a bi-stable multivibrator 31. This shaped wave generator, for the particular design in the present invention is preferably a square wave generator. However, waves of other shapes may be adapted for the present invention.

The shaped wave generator 31 has one terminal, terminal A, connected through the line 32 to crystal 37, the other terminal of which is connected to the inner conductor of terminal II of the hybrid 11. Another terminal, terminal B of the shaped wave generator 31 is connected to crystal 36, the other terminal of which is connected to the inner conductor of terminal I of the hybrid 11. The shaped wave generator 31 should be selected so as to provide 180° out-of-phase pulse signals to the lines 32 and 33. These signals should be slightly positive at the maxima and quite negative at the minima. A preferred signal for the lines 32 and 33 is illustrated in FIGURE 2. Both terminals I and II have connected to their inner conductors, through crystals 36 and 37, by-pass capacitors 38 and 39 which are large enough to by-pass signals of RF frequencies but not signals at audio frequencies. The lines 32 and 33 are connected to the capacitors 39 and 38 respectively with the connection being made to the same side of the capacitors. The other side of the capacitors may be formed by the shield 60 with the interposed mica dielectric material 61. These crystals have current passing characteristics typically illustrated in FIGURE 3, in which relatively large amounts of current are passed at small positive voltages. This results in a low RF impedance at the terminals when the voltage is positive and a higher RF impedance when the voltage is negative, thus in effect providing alternate short and open circuits to the terminals I and II as the oscillator and shape wave generator provides the pulses above described to the respective terminal. As the oscillator generator is providing pulses at a frequency of 10,000 c.p.s. for example, the phase of the transmitted wave from antenna 2 is shifted 180° or substantially 180° at a frequency of 10,000 c.p.s. This rapid shifting of the phase causes a resultant fluctuation at a rapid rate of the resultant signal received from antennas 1 and 2. Thus, if a null is created in a certain area between two lobes due to the combination of the out-of-phase signals received on the antennas 1 and 2, the effect of the shifting of phase of the transmitted wave of antenna 2 will alternate the signal nulls and maxima at a super-sonic rate. Consequently, if the point with which the transmission is being established were in the absence of the above invention in a null area, the effect of the invention would be to cause the null to be replaced one half of the time at a super-sonic oscillating rate with a maximum lobe. As this occurs at a super-sonic rate or at a rate above the audio frequency actually used, the interruption at this high rate does not hinder the reception of the voice signals provided a low pass filter is used to reject the high pitched whistle and transmit the voice signals.

When the unit is being used, for transmission and reception, the frequency at which the phase of the signal from antenna 2 is shifted, may be substantially different for transmission than for reception. Thus, for example, the phase of the signal on antenna 2 may be shifted 20,000 c.p.s. for transmission and 10,000 c.p.s. for reception. The purpose of this is to avoid the effect which would result if both the transmitting and receiving station were equipped with devices of the present invention which were in complete synchronism with one another and modulated by a square wave. In such an event, the two devices would, so to speak, cancel each other's signal. If the phase shifting is done so that the variation of phase with time is sinusoidal as opposed to square wave, a complete cancellation of this type would not occur. The oscillator 30 may be made to generate two frequencies, one for transmission and one for reception. The modulating signal at "transmission frequency" $F_t$ would be connected into the circuit by suitable means during transmission and signal at the "reception frequency" $F_r$, would be connected into the circuit during the use of the receiver. For this purpose the switch 41 used for controlling the oscillator frequency may be ganged with the switch 7 used to selectively connect the transmitter or receiver. This arrangement is desirable because it does not require critical adjustment.

Having now described my invention, I claim:

1. In combination with an aircraft, and a pair of antennas, means mounting said antennas on opposite portions of said aircraft, means for rapid and substantial interchange of signal nulls and lobes resultant from simultaneous usage of said pair of antennas for a radio communication device transmitting information on a high frequency carrier signal comprising means connecting one antenna directly to a common input to said device, means connecting the other antenna to said common input through a hybrid junction and impedance changing means connected to said hybrid junction adapted to phase shift the transmitted wave on said other antenna with respect to said one antenna at a frequency substantially in excess of the maximum frequency of said information signal.

2. A device as set forth in claim 1 wherein said hybrid junction comprises a network having four coaxial terminal pairs with an outer casing of conductive material coupled to each terminal pair, a coaxial conductor positioned within the casing having parallel elements connected together near one end of the casing and forming the inner conductor of one terminal pair at said end, a second inner conductor partially forming a second terminal pair extending from the other end of said casing within one parallel element to said other parallel element crossing over intermediate the ends thereof said third and fourth terminal pairs each connected to one of said parallel elements intermediate the ends thereof, and said impedance changing means comprises a pair of unilaterally conducting devices respectively connected across said third and fourth terminal pairs.

3. In combination with an aircraft, and a pair of antennas, means mounting said antennas on opposite portions of said aircraft, means for rapid and substantial interchange of signal nulls and lobes resultant from simultaneous usage of said pair of antennas for a radio communication device transmitting information upon a high frequency carrier signal comprising means connecting one antenna directly to a common input to said device, means connecting the other antenna between said common input through a four terminal pair network, said last mentioned means being connected to opposite terminal pairs of said network, said network including impedance changing means for phase shifting the transmitted wave on said other antenna with respect to said one antenna at a frequency substantially in excess of the maximum frequency of said information signal in response to alternating pulse signals applied to the remaining two of said terminal pairs, and means for applying alternating pulse signals to said remaining two terminal pairs.

4. In combination with an aircraft, and a pair of antennas, means mounting said antennas on opposite portions of said aircraft, means for rapid and substantial interchange of signal nulls and lobes resultant from simultaneous usage of said pair of antennas for a radio communication device transmitting information upon a high frequency carrier signal comprising means connecting one antenna directly to a common input to said device, means connecting the other antenna to said common input through a four terminal pair network, said last mentioned means being connected to opposite terminal pairs of said network, and impedance changing means connected across the other two of said terminal pairs, said network having means for phase shifting the transmitted wave passing therethrough in response to a pulse signal applied to said impedance changing means, and means for applying a pulse signal to said impedance changing means at a frequency substantially in excess of the maximum frequency of said information signal.

5. A device as set forth in claim 4 wherein said pulse signal frequency is at least substantially twice the maximum signal signal frequency.

6. In combination with an aircraft, and a pair of antennas, means mounting said antennas on opposite portions of said aircraft, means for rapid and substantial interchange of signal nulls and lobes resultant from simultaneous usage of said pair of antennas for a radio communication device transmitting information upon a high frequency carrier signal comprising means connecting one antenna directly to a common input to said device, means connecting the other antenna to said common input through a four pair network, said last mentioned means being connected to opposite terminal pairs of said network, said network having means for phase shifting the transmitted wave in response to impedance changes at the other two of said terminal pairs, and means for periodically changing the impedances at said other two terminal pairs at a frequency substantially in excess of the maximum frequency of said information signal.

7. A device as set forth in claim 6, wherein said means for changing the impedance at said other terminals comprises a crystal and condenser in series connected across each of said other two terminal pairs, and means for applying pulses to each condenser substantially in phase opposition.

8. A device as set forth in claim 6, wherein said means for changing the impedances at said other terminals include crystals connected to each of said other terminals, said crystals having high impedances on application of negative potential and low impedance on application of positive potential, and means for applying alternating pulses of negative and positive potential to said crystals in phase opposition.

9. A device as set forth in claim 6 wherein said radio communication device comprises a transmitter and receiver and said common input is provided with a switch for selectively connecting said antennas with one of the transmitter and receiver.

10. A device as set forth in claim 6 wherein said radio communication device comprises a transmitter and receiver, said impedance changing means is provided with means for changing the impedance at two separated frequencies and switch means for selectively and simultaneously connecting said antennas to one of the transmitter and receiver and changing said frequency.

11. Means for information signal transmitting from and receiving in an aircraft comprising, in combination, said aircraft, a pair of antennas secured to the aircraft in spaced complementary positions including means connecting one antenna directly through a common input to an audio transducing device, means connecting the other antenna to said common input through opposite terminal pairs of a four terminal pair network, said network adapted to phase shift the transmitted wave on said other antenna with respect to said one antenna at a frequency substantially in excess of the maximum frequency of the signal transmitted in response to impedance changes at the other two of said terminal pairs, and means for varying the impedance at said other terminals from maximum to minimum alternately at a frequency rate substantially in excess of the maximum frequency of the information signal transmitted.

12. Apparatus for communicating with a vehicle by means of a high frequency carrier signal wherein at least one dimension of said vehicle is much larger than a wavelength of said high frequency carrier comprising, first and second antennas supported by said vehicle, each oriented to illuminate regions obscured to the other by said vehicle itself electrical communication apparatus supported by said vehicle, and means for coupling said antennas to said electrical communication apparatus, said coupling means including means for periodically varying the relative phase between high frequency energy exchanged between said first antenna and said electrical communication apparatus and energy of said same high frequency exchanged between said second antenna and said electrical communication apparatus, said antennas thereby coacting with each other and surfaces of said vehicle to provide a radiation system having a wide illumination angle virtually free from nulls, said periodic phase varying means comprising, a hybrid network having four terminal pairs, a first two of said terminal pairs being connected to said first and second antennas respectively, and means for effectively short circuiting the other two of said terminal pairs during alternate mutually exclusive time intervals to periodically reverse the relative phase between energy of said high frequency at said first two terminal pairs.

13. Apparatus in accordance with claim 12 wherein said short circuiting means includes a pair of unilaterally conducting devices respectively connected across each of said other two terminal pairs, and means for rendering said device conductive during alternate mutually exclusive intervals.

14. Apparatus for varying the relative phase between a first high frequency signal coupled between a first device and a second device and a second high frequency signal coupled between said first device and a third device comprising, a four terminal pair hybrid network, means for coupling said first and second devices to a first of said terminal pairs, means for coupling said third device to a second of said terminal pairs opposite to said third terminal pair, and means for periodically changing the impedance across the remaining two terminal pairs to present a high impedance across one of the latter pairs and a low impedance across the other.

15. Apparatus in accordance with claim 14 wherein said impedance changing means includes a unilaterally conductive device connected across each of said remaining two terminal pairs, and means for rendering said unilaterally conductive devices conducting during alternate mutually exclusive time intervals.

16. Apparatus for communicating with a vehicle by means of a high frequency carrier signal wherein at least one dimension of said vehicle is much larger than a wavelength of said high frequency carrier comprising, first and second antennas supported by said vehicle, each oriented to illuminate regions obscured to the other by said vehicle itself electrical communication apparatus supported by said vehicle, and means for coupling said antennas to said electrical communication apparatus, said coupling means including means for periodically varying the relative phase between high frequency energy exchanged between said first antenna and said electrical communication apparatus and energy of said same high frequency exchanged between said second antenna and said electrical communication apparatus, said antennas thereby coacting with each other and surfaces of said vehicle to provide a radiation system having a wide illumination angle virtually free from nulls, said electrical communication apparatus including a transmitter and receiver, means for selectively coupling said antennas to said transmitter and receiver, and means for varying said relative phase at different transmitting and receiving rates when said transmitter and receiver respectively are coupled to said antennas by said selective coupling means.

References Cited in the file of this patent

UNITED STATES PATENTS

| 1,819,589 | Beverage | Aug. 18, 1931 |
| 1,877,858 | Hahnemann | Sept. 20, 1932 |
| 2,403,500 | Carlson | July 9, 1946 |
| 2,416,336 | Marchand | Feb. 25, 1947 |
| 2,462,893 | Pontecorvo | Mar. 1, 1949 |
| 2,587,590 | Brewer | Mar. 4, 1952 |
| 2,617,885 | Cutler | Nov. 11, 1952 |
| 2,618,747 | Luck | Nov. 18, 1952 |
| 2,640,915 | Sichak | June 2, 1953 |

FOREIGN PATENTS

| 674,874 | Great Britain | July 2, 1952 |

OTHER REFERENCES

Proceedings, Royal Society of London, 1952, vol. 211A, pages 351 to 361.